United States Patent [19]

Gheen

[11] 4,291,837
[45] Sep. 29, 1981

[54] AUTOMATIC MULTIPLE MOVE IRRIGATION LINE

[76] Inventor: Lyndle G. Gheen, 1173 Clinton Dr., Eugene, Oreg. 97401

[21] Appl. No.: 92,950

[22] Filed: Nov. 13, 1979

Related U.S. Application Data

[63] Continuation of Ser. No. 941,194, Sep. 11, 1978, which is a continuation of Ser. No. 757,033, Jan. 5, 1977, abandoned.

[51] Int. Cl.³ ............................................. A01G 27/00
[52] U.S. Cl. ........................................ 239/70; 239/69; 239/718
[58] Field of Search ................ 137/344; 239/709, 721, 239/69, 70, 177, 124, 718

[56] References Cited

U.S. PATENT DOCUMENTS

| | | | |
|---|---|---|---|
| 3,512,548 | 5/1970 | Miller | 137/344 |
| 3,836,078 | 9/1974 | Olson et al. | 239/212 |
| 3,929,197 | 12/1975 | Malott et al. | 239/212 |
| 3,978,887 | 9/1976 | Dryla | 239/70 |
| 3,984,052 | 10/1976 | Dipalma | 239/183 |
| 4,043,505 | 8/1977 | Sherman | 239/212 |
| 4,223,839 | 9/1980 | Bleakney | 239/177 |
| 4,232,705 | 11/1980 | Hait | 137/899.1 |

Primary Examiner—Martin P. Schwadron
Assistant Examiner—A. Michael Chambers
Attorney, Agent, or Firm—Klarquist, Sparkman, Campbell, Leigh, Hall & Whinston

[57] ABSTRACT

An irrigation line move operates fully automatically for twenty-four hours and includes a prime mover carriage carrying a gasoline engine which drives a pipe of a wheel line through a hydraulic drive system, and the wheel pipe, through a first planetary transmission, drives a shaft paralleling the pipe. The shaft drives a slave carriage through a second planetary transmission. The engine is started under the control of a circuit having a stepping switch which sequentially shuts off water to the line, allows the line to drain, starts the engine to move the line, stops the engine, and turns on the water to the pipe. The above cycle is repeated after a given time of irrigation. The first planetary transmission includes a chain driving a plurality of planetary sprockets.

11 Claims, 23 Drawing Figures

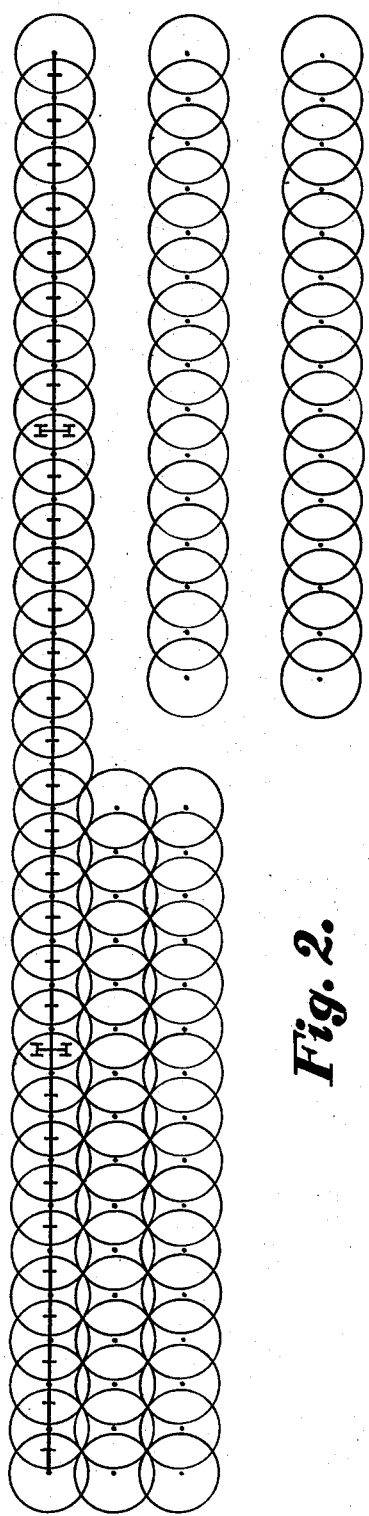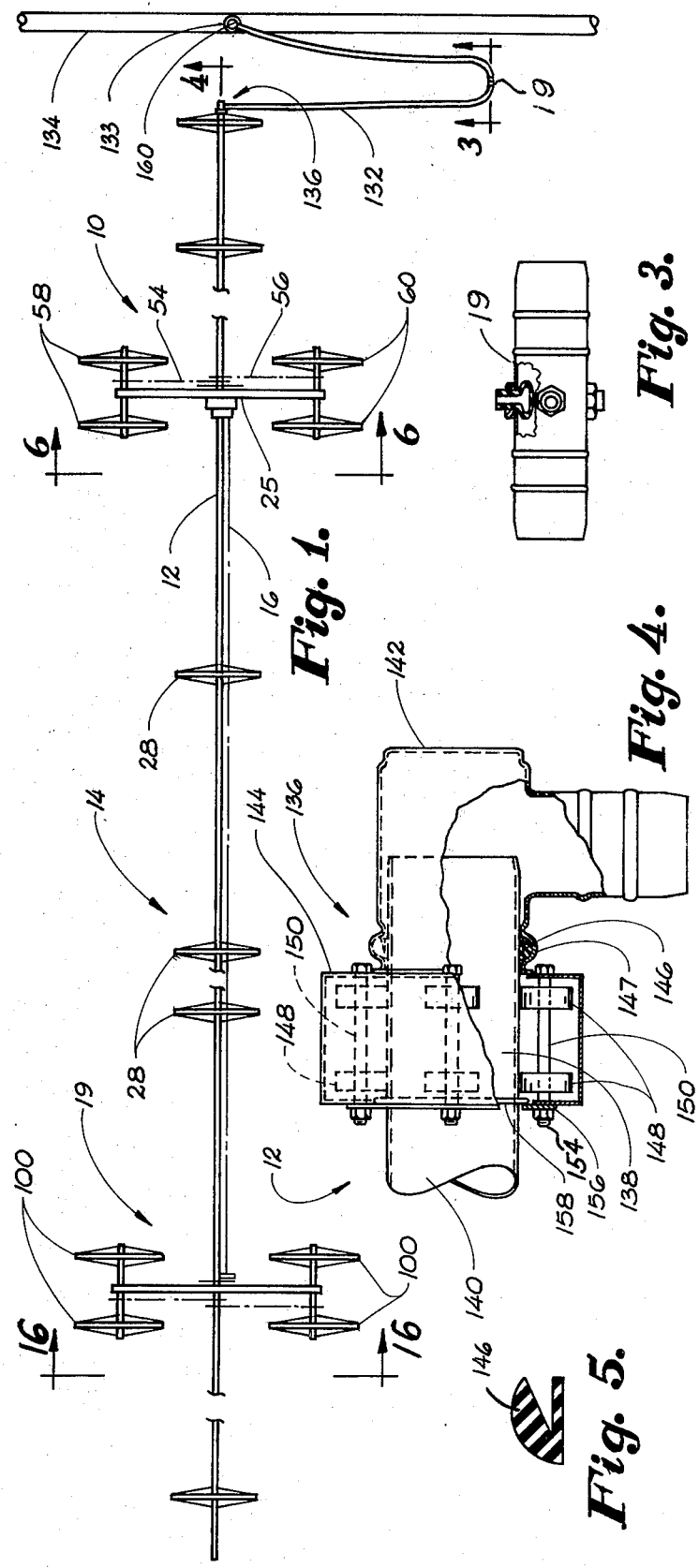

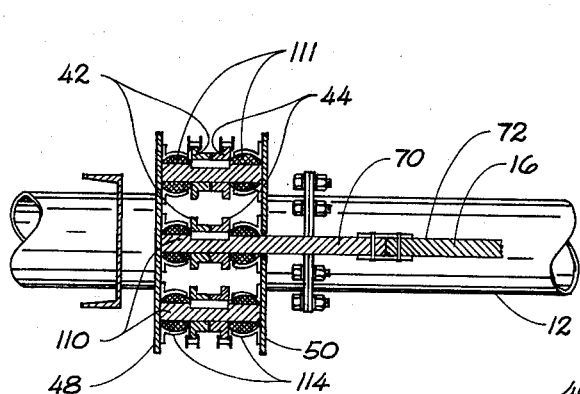
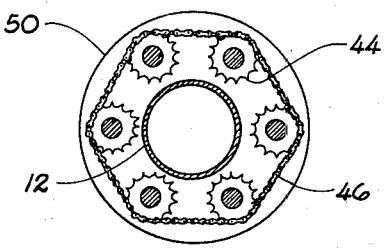
Fig. 11.
Fig. 12.
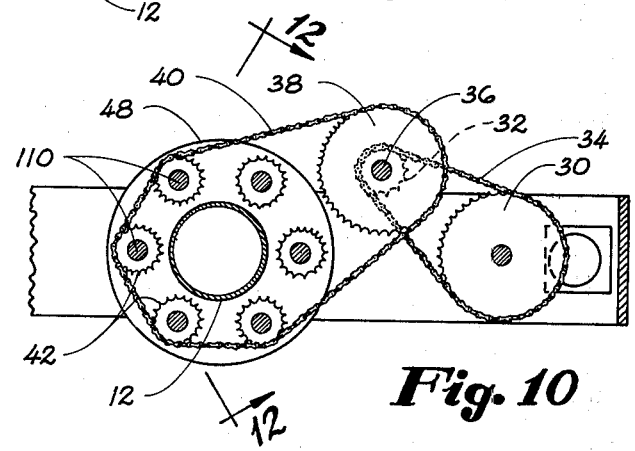
Fig. 10
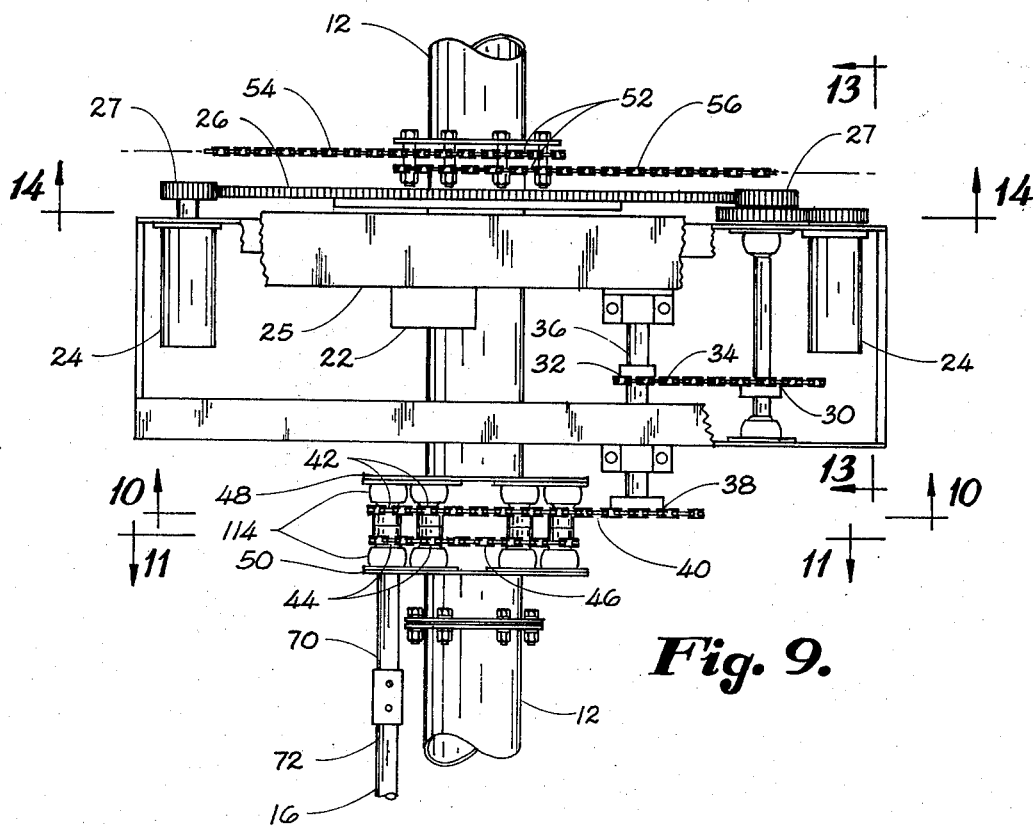
Fig. 9.

[4,291,837]

AUTOMATIC MULTIPLE MOVE IRRIGATION LINE

This is a continuation of application Ser. No. 941,194, filed Sept. 11, 1978, which is a continuation of application Ser. No. 757,033, filed Jan. 5, 1977, now abandoned.

DESCRIPTION

This invention relates to an automatic multiple move irrigation line, and has for an object thereof the provision of an automatic multiple move irrigation line.

Another object of the invention is to provide an irrigation line moved from set to set automatically.

A further object of the invention is to provide an improved drive for a wheel move.

Another object of the invention is to provide a wheel move in which a master carriage driving the line also drives a shaft, extending along the line, through a drive planetary gearing including a plurality of planetary gears and a plurality of sprockets keyed to the gears and driven by a drive chain driven with the line, the shaft driving a slave carriage through a driven planetary gearing like the drive planetary gearing.

Another object of the invention is to provide a new and improved rotary coupler for supplying water to a line move.

In the drawings:

FIG. 1 is a fragmentary, top plan view of an automatic multiple move irrigation line forming one embodiment of the invention;

FIG. 2 is a schematic, top plan view of the line of FIG. 1 showing several sets.

FIG. 3 is an enlarged, partially-sectional, elevation view of a drain coupling of the line of FIG. 1;

FIG. 4 is an enlarged, longitudinal, sectional view of a rotary coupler of the line of FIG. 1;

FIG. 5 is an enlarged, sectional view of a seal of the coupler of FIG. 4;

FIG. 9 is an enlarged, fragmentary, top plan view taken along line 9—9 of FIG. 6;

FIG. 10 is an enlarged, vertical, sectional view taken along line 10—10 of FIG. 9;

FIG. 11 is an enlarged, vertical, sectional view taken along line 11—11 of FIG. 9;

FIG. 12 is an enlarged, vertical, sectional view taken along line 12—12 of FIG. 10;

Figure 6:
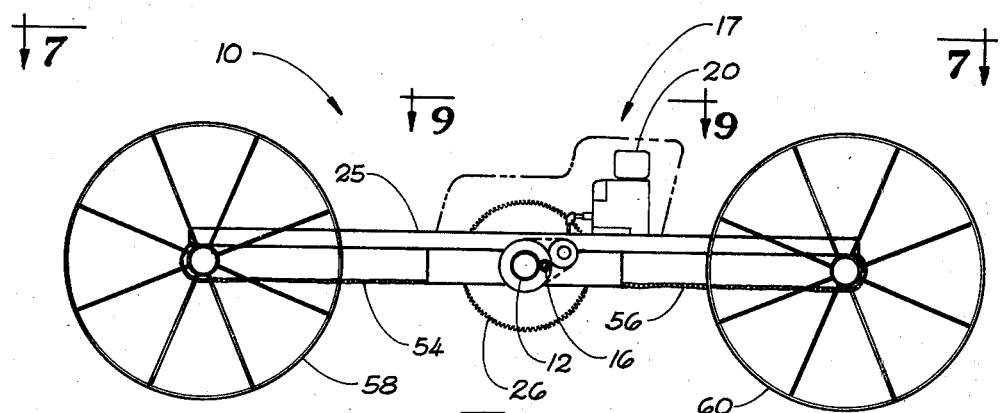
FIG. 6 is an enlarged, vertical, sectional view taken along line 6—6 of FIG. 1.
Figure 7:
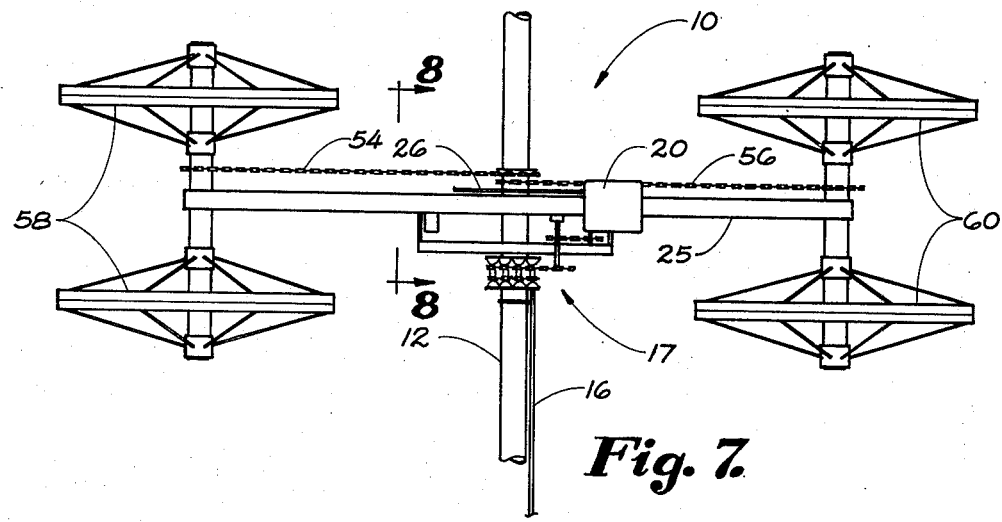
FIG. 7 is an enlarged, top plan view taken along line 7—7 of FIG. 6.

An automatic multiple move wheel line forming one specific embodiment of the invention includes a master or prime mover carriage 10, which supports and drives at one intermediate point along a pipe 12 of a wheel line 14 and also drives a shaft 16 through a driving planetary drive 17 to drive through a driven planetary drive 18, a slave or driven carriage 19, which supports and drives the wheel line at a second intermediate point along the pipe 12. Between the carriages, the pipe sections are coupled together by tongue transmitting couplings having sprinkler risers and known drain valves 19 (FIG. 3) in hose 132 serving to drain the line when water pressure is cut off from the line, the couplings and sprinkler risers being very well known and readily available and are not shown because of the scale of the drawings. The carriage 10 supports a gasoline engine 20 (FIG. 6) which drives a hydraulic pump 22, which drives hydraulic motors 24, the reservoir of the hydraulic system being a tubular body or hollow beam 25 forming the chasis of the carriage 10. The motors 24 (FIG. 9) drive, through pinions 27, a bull gear 26 keyed to the pipe to rotate the pipe and also rotate wheels 28 (FIG. 1) keyed to and supporting the pipe.

One of the motors 24 (FIGS. 3 and 9) also drives a sprocket 30 of the planetary drive 17 to drive a sprocket 32 through a chain 34, and the sprocket 32 drives a shaft 36 to drive a sprocket 38 to drive a chain 40. The chain 40 meshes with and rotates first planetary sprockets 42 which are keyed to second planetary sprockets 44 (FIGS. 9 and 10) drivingly connected together by a chain 46. The sprockets 42 are mounted on a disc 48 keyed to the pipe 12, and the sprockets 44 are mounted on a disc 50 keyed to the pipe. Sprockets 52 keyed to the pipe drive, through chain 54 and 56, wheels 58 and 60 supporting tubular body 25 of the carriage 10.

Figure 19:
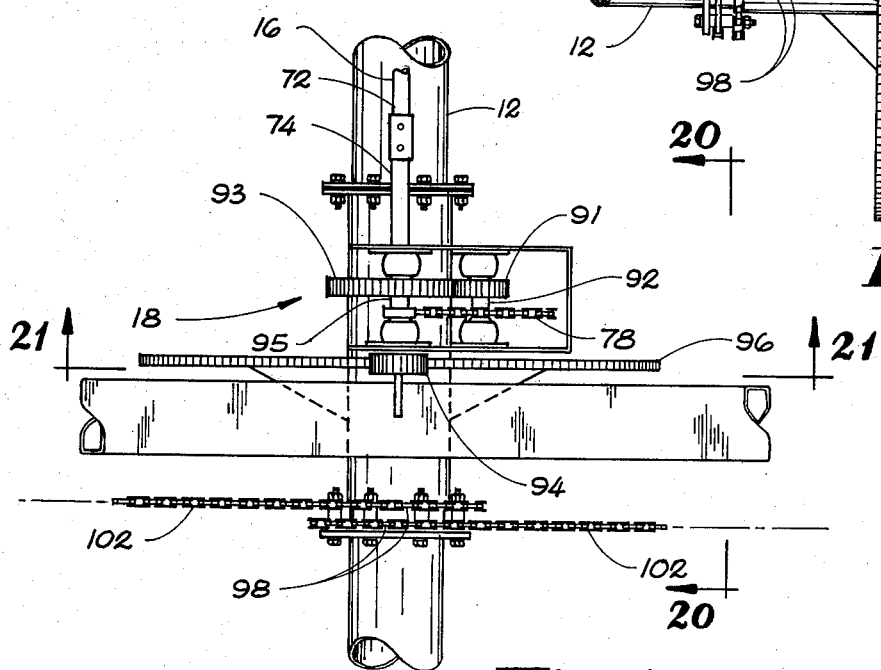
FIG. 19 is an enlarged, fragmentary, top plan view of a portion of the line of FIG. 1.

One of the sprockets 44 drives the shaft 16 (FIG. 8) which includes a stub shaft 70 paralleling the pipe, a tubular torquing shaft 72 and a stub shaft 74 (FIG. 19). The stub shaft 74 is keyed to sprocket 76 of the planetary drive 18, and the sprocket 76 drives a chain 78 to drive sprocket 90 which is keyed to gear 91 through shaft 92. Gear 93 is driven by gear 91. Gear 93 is keyed to gear 94 through shaft 95. The sprockets 76 and 90 and gear 94 are mounted on drive housing 80 fixed to the pipe 12.

Figure 15:
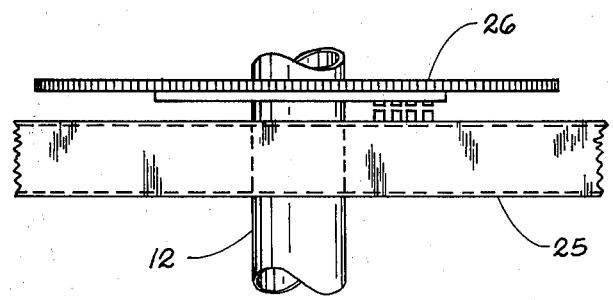
FIG. 15 is an enlarged, fragmentary, horizontal, sectional view taken along line 15—15 of FIG. 13.
Figure 14:
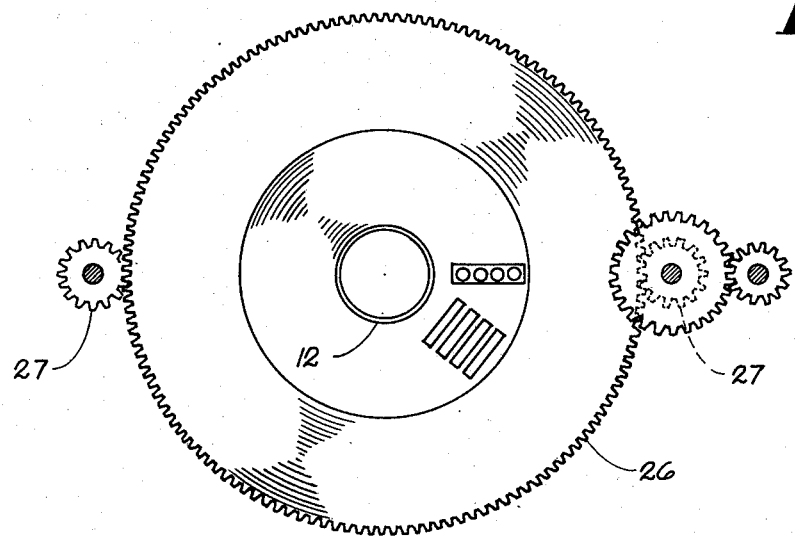
FIG. 14 is an enlarged, vertical, sectional view taken along line 14—14 of FIG. 9.
Figure 13:
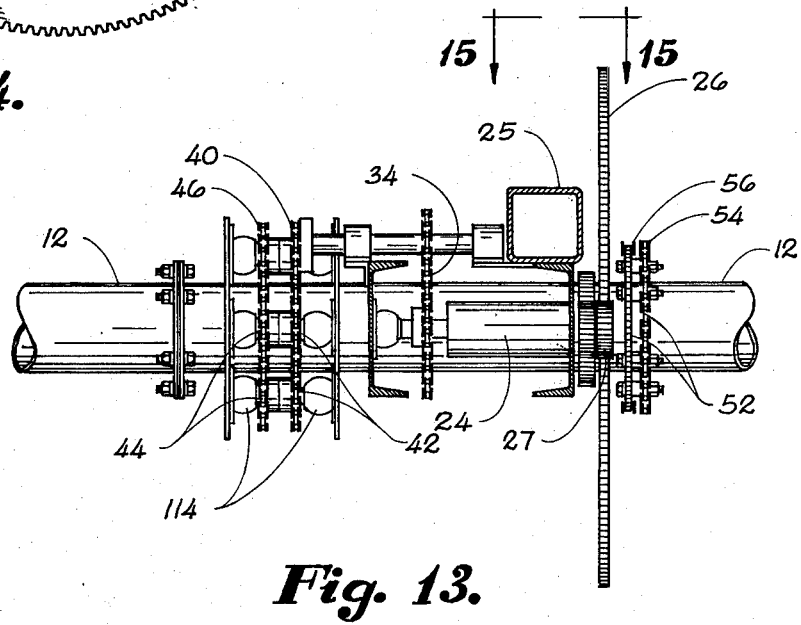
FIG. 13 is an enlarged, vertical, sectional view taken along line 13—13 of FIG. 9.
Figure 16:
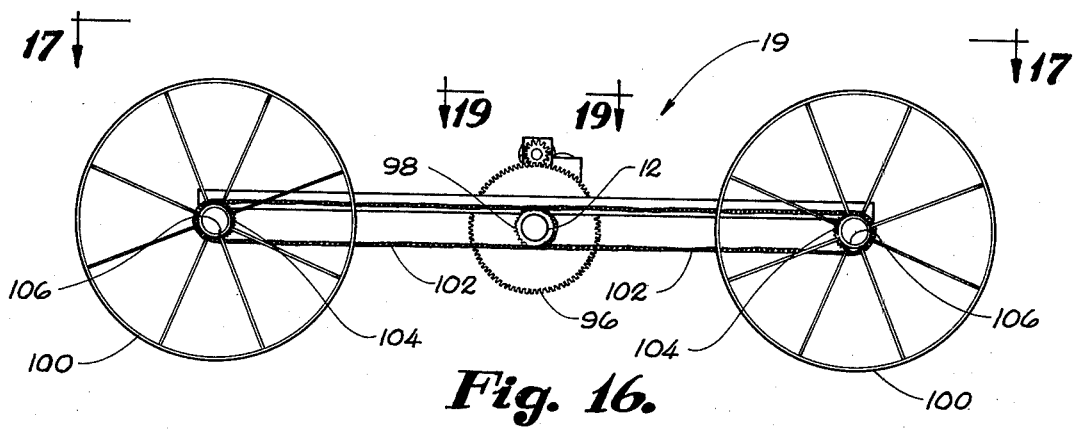
FIG. 16 is an enlarged, vertical, sectional view taken along line 16—16 of FIG. 1.
Figure 17:
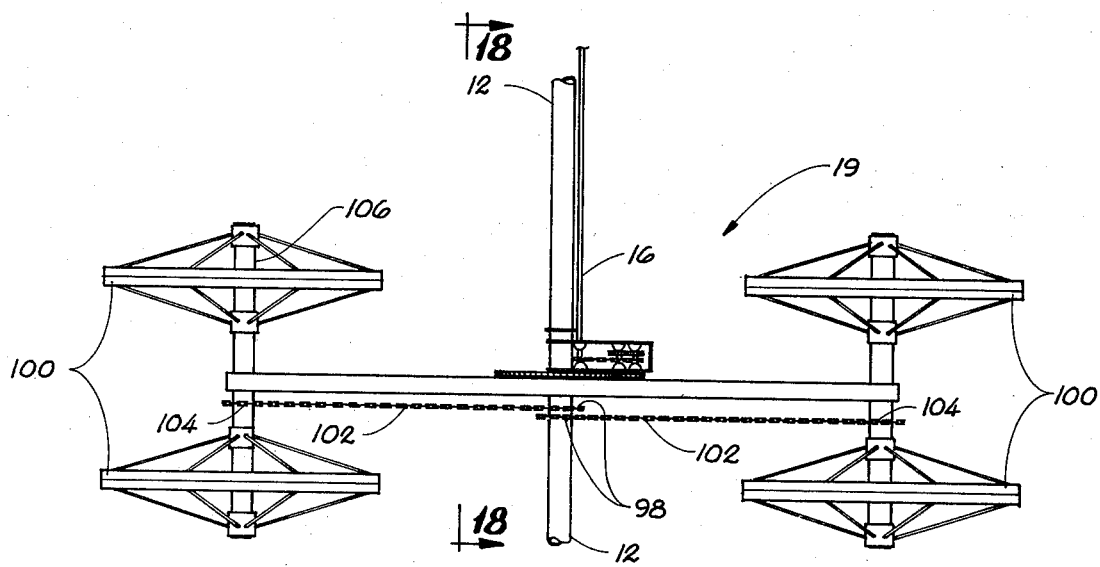
FIG. 17 is an enlarged, top plan view taken along line 17—17 of FIG. 16.
Figure 18:
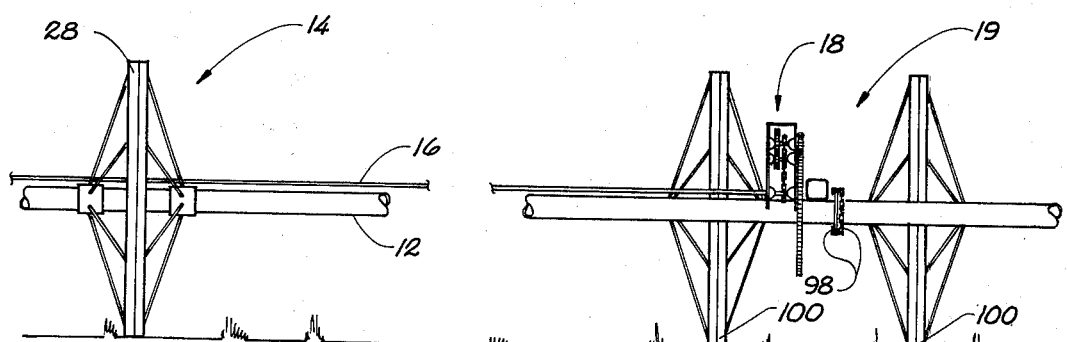
FIG. 18 is an enlarged, fragmentary, vertical, sectional view taken along line 18—18 of FIG. 17.
Figure 21:
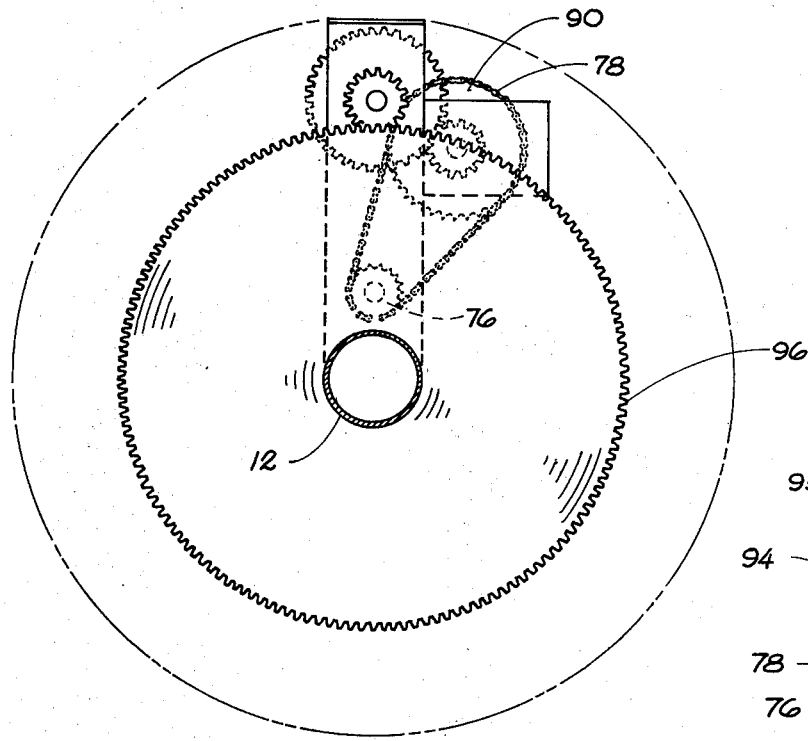
FIG. 21 is a vertical, sectional view taken along line 21—21 of FIG. 19.
Figure 20:
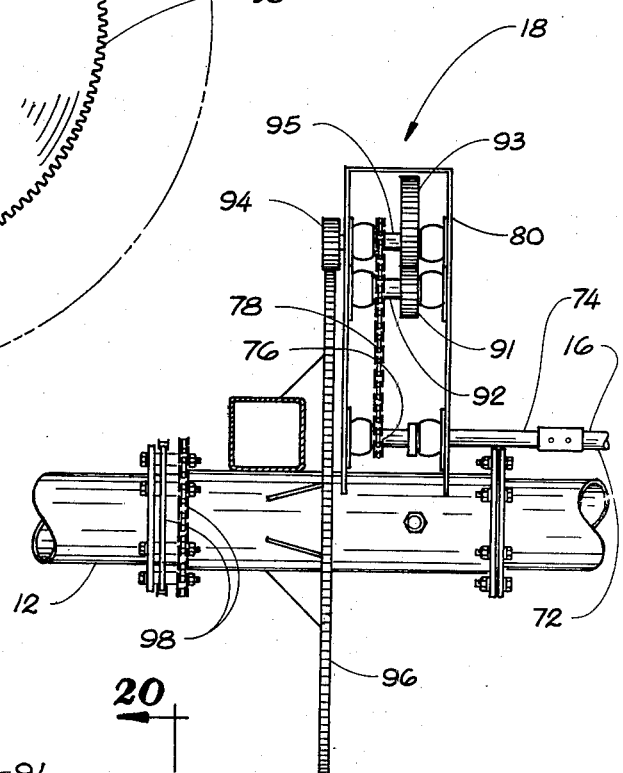
FIG. 20 is a view taken along line 20—20 of FIG. 19.

The gear 94 drives against a bull gear 96 thus rotating drive 18 at the same speed of rotation as the bull gear 26. The bull gear 96 is keyed to carriage 19. Sprockets 98 (FIGS. 15 and 16) keyed to the pipe 12 drive wheels 100 of the slave carriage 19 through chains 102 and sprockets 104 keyed to axles 106 to which the wheels are keyed. Thus, the pipe 12 is driven without lag at both the carriages so that there is no lag due to any set twist of the pipe between the two carriages.

Each of the planetary sprockets 42 (FIGS. 9 and 10) is keyed to a shaft 110 to which one of the sprockets 44 is keyed. The shafts 110 are journaled in bearings 111 carried by the discs 48 and 50 and the bearings and shafts are enclosed in bell housings 114.

The pipe 12 (FIG. 1) is plugged at one end, and carries self-levelling sprinklers (not shown) at spaced points therealong. The pipe supplies to the sprinklers water supplied to the pipe through a hose 132 from a valve stub 133 on a mainline supply pipe 134 and a rotary coupler 136 at the other or unplugged end of the pipe. The coupler (FIG. 4) includes a flanged pipe 138 bolted to one of pipe sections 140 of the pipe 12, and an elbow 142 connected to the hose 132 is carried by a rotary housing 144 rotatably on the pipe 138, a chevron seal 146 fitting in groove 147 and sealing the elbow to the pipe. The housing 144 is rotatably mounted on the pipe 138 by pairs of plastic rollers 148 molded on tubes 150 rotatable on tubular spacers or bushings (not shown) in the tubes 150 and on bolts 154. The housing is retained on the pipe 138 by a segmental ring 156 bolted to the housing and extending radially inwardly beyond the outer periphery of a bead 158 formed on the pipe 138, the adjacent rollers limiting movement farther onto the pipe. A swivel joint 160 (FIG. 1) on the mainline supply pipe 134 connects the valve stub 133 to the hose 132.

To start the line move in operation, a momentary switch 180 is closed manually to momentarily energize, across a powerline 183 from the battery (not shown) on the carriage, a release coil 184 of a latching relay and a reset timer relay winding 186. The timer relay winding 186 immediately closes holding contacts 188 and contacts 190 and 192. The closing of contacts 190 energizes water supply valve solenoid 194 to shut off the water to the pipe 12. Shutting and the closing of contacts 192 energizes stepping relay winding 196 to cause contactor 198 to step from contact 201 to contact 202, switch 197 closing at this time and remaining closed throughout the subsequent stepping to and engagement of the contactor 198 with contacts 202, 203, 204, 205, 206, 207, 208, 209, 210, 211 and 212. When the stepping relay closes the contacts 202, it also closes contacts 214 to energize drain timer 216, which is set to allow sufficient time for draining the line, for example, ten minutes. Then the drain timer closes contacts 218 to step the stepping relay contactor 198 from the contacts 202 to the contacts 203 to drop out contacts 214 and the timer 216 and to close contacts 220.

Closing contacts 220 energizes time delay relay winding 222, solenoid winding 224 actuating the choke of the engine and starter solenoid winding 226 of the engine to start the engine. After five seconds, the relay 222 closes contacts 228 to cause the contactor 198 to be stepped from the contact 203 to the contact 204. The stepping relay then closes contacts 230 to energize time delay relay 232, which, after thirty seconds, closes contacts 234. If the engine has started, a centrifugally operated switch 236 is operated thereby to close, and, on the closure of either the contacts 234 or the switch 236, the stepping relay is stepped to move contactor 198 into engagement with contact 205, and steps on through contacts 206 and 207 to contact 208. If the engine did not start, when the stepping relay moved the contactor 198 from the contact 204 to the contact 205, the relay 232 drops out to open the contacts 234 and the stepping relay is not stepped further immediately but, instead closes contacts 220 again to again initiate the starting cycle which causes the stepping relay to step from closure of contacts 205 to closure of contacts 206. If the engine is started, it closes the contacts 236 to cause the stepping relay to step on through until the contactor 198 engages contact 208. If the engine did not start, the stepping relay steps the contactor from the contact 205 to the contact 206 to initiate another starting cycle and step to the contact 207. If the third attempt to start the engine was successful, the engine closes contacts 236 to step the stepping relay from the contact 207 to the contact 208. If the third starting attempt was unsuccessful, the stepping relay is not stepped from the contact 207 and nothing happens until an operator comes out and resets the circuit by closing contacts 240.

Assuming the engine to have started so that the contactor 198 was stepped to engage the contact 208, the stepping relay 196 closes contacts 242 to energize forward solenoid winding 244 or reverse solenoid winding 246, depending on the setting of manually operable switch 248. The winding 244 or 246 sets the four-way valve to the hydraulic motors 24 to drive the line and a wheel-driven, counter-type switch 250 is closed to cause the stepping relay 196 to step the contactor 198 from the contact 208 to the contact 209. A hydrostatic transmission and a mechanical drive train can be used in place of the valve and motor. This causes the relay 196 to close contacts 252 to energize time delay relay 254 and close contacts 255 to start reset timer 186. After a selected delay, up to thirty minutes, the relay 254 closes contacts 256 to step the timer to move the contactor 198 from the contact 209 to the contact 210. The stepping relay then closes contacts 258 to energize latching coil 260 to close contacts 261 and 262 to step the stepping relay through contacts 211 and 212 back to contact 201, the relay 260 opening contacts 264 to drop itself out. Then, the sprinkling goes on until the reset timer 186 times out to start the cycle again. Contact 261 of the latching relay 260 has now partially completed the circuit for relay winding 263. After the machine has gone through the watering, starting and moving cycle for the second time, the relay winding 263 is energized by relay 254 over contacts 261 and interlocks relay winding 263. Contacts 167 open the circuit to the programmer coil to prevent this coil from becoming energized after the third watering cycle.

Figure 22:
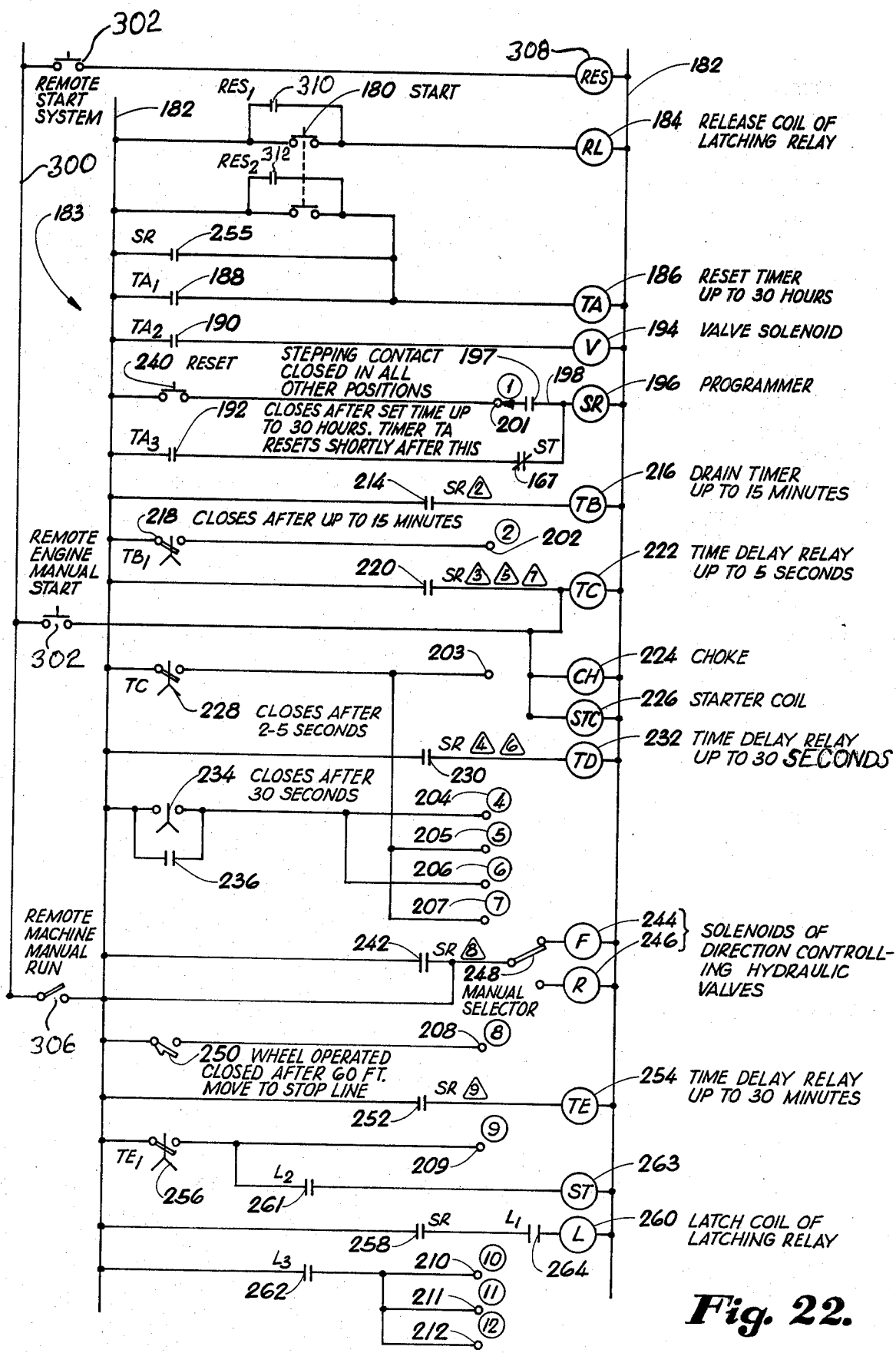
FIG. 22 is a diagrammatic view of a control circuit of the line of FIG. 1.
Figure 23:
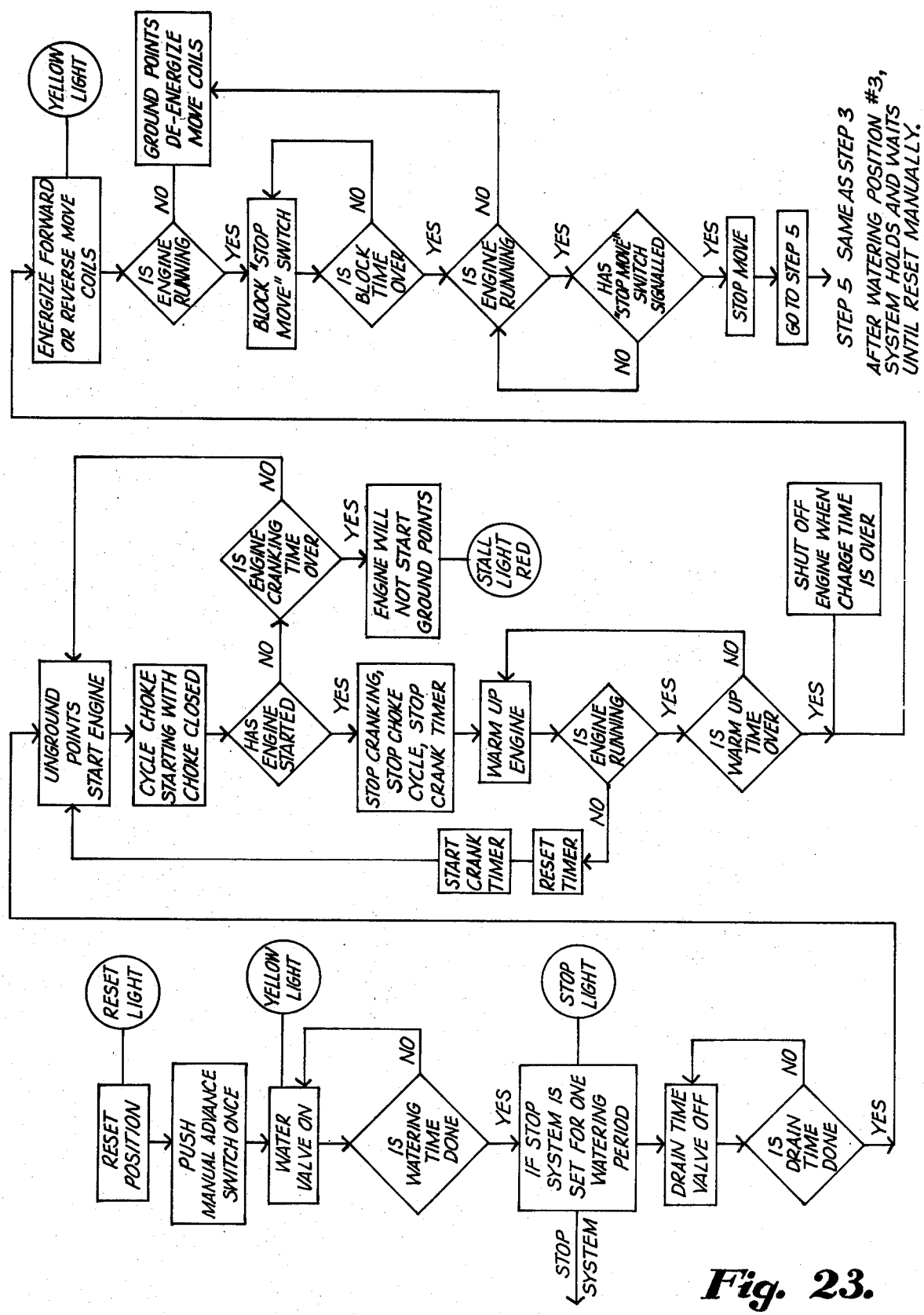
FIG. 23 is a schematic view of the operation of the line of FIG. 1.

A remote control line 300 (FIG. 22) extends along the line to the right hand end of the line, as viewed in FIG. 1 for an operator at that location to start the line for an automatic run by closing contacts 302 (FIG. 22) or for starting the engine by closing contacts 304, or for setting up the circuit for manual operation by closing contacts 306. Momentarily closing the contacts 302 momentarily energizes relay winding 308 to close contacts 310 to the release coil 184 of the latching relay and also close contacts 312 to the reset timer winding 186.

At the end of the third watering cycle, this timer 186 resets. The valve 194 closes and the complete cycle of two moves and three watering cycles is finished. The operator then has to move the machine to the next starting position, reconnect the hose and start the machine for the next series of operations of two moves and three times watering. Thus, by setting the timer 186 to make each watering time eight hours, the entire cycle takes twenty-four hours and an operator is required only once each day.

If desired, the four-way valve, of which the windings 244 and 246 are a part, and the hydraulic motors 24 may be omitted and a hydrostatic transmission, which is reversible substituted therefor.

What is claimed is:
1. In an automatic multiple move irrigation line, an irrigation pipe,
wheel means supporting the pipe,
a prime mover, motor means drivable by the prime mover for driving the wheel means, starting means for starting the prime mover, solenoid means for actuating the starting means, means for supplying water under pressure to the pipe, timing circuit means for periodically actuating the solenoid means.

water control means responsive to the timing circuit means for shutting off the water supplying means before each actuation of the starting means, drain means resonsive to said circuit means for draining the pipe before each actuation of said starting means, means for stopping the prime mover at the end of each predetermined move of the line, the water control means being responsive to the timing circuit means for actuating the water supplying means to the line only after the prime mover is stopped each time to sprinkle, and means responsive to a predetermined number of cycles of moves and sprinklings for actuating the water control means and prevent further actuation of the solenoid means.

2. The line of claim 1 wherein the prime mover comprises a gasoline engine, the starting means including a starter for starting the engine, the timer means including means for actuating the starting means a plurality of times until the engine is started.

3. The line of claim 2 including a remote control manual override switch at one end of the line for actuating the starting means.

4. The line of claim 3 including a remote control manual override switch for running the engine at said end of the line.

5. The line of claim 1 including reversible transmission means driving the wheel means and driven by the prime mover and manual control means for reversing the transmission means to reverse the direction of movement of the wheel means.

6. In an automatic multiple move irrigation line, an irrigation pipe, a plurality of wheels keyed to the pipe, wheel carriage means, transmission means for rotating the pipe, drive means carried by the carriage means and including a prime mover for driving the transmission means, programming means for automatically periodically starting and running the prime mover, means responsive to movement of the pipe over a predetermined distance for stopping the prime mover, and counting means for establishing a predetermined maximum number of moves of the pipe and for preventing further starting of the prime mover after the last of the maximum number of moves of the pipe occurs and including manually operable means for starting the programming means, the programming means including means for opening valve means to sprinkle for a predetermined period of time after the manually operable means has started the programming means and for closing the valve means at the end of said predetermined period of sprinkling time, the line including automatic drain means, said drain means responsive to a timing means for draining the line prior to the starting of the prime mover, said timing means responsive to said programming means, the programming means serving to start the prime mover a predetermined period of drain time after said end of the period of sprinkling time, coupler means for connecting the engine to the transmission means, the programming means serving the actuate the coupler means to connect the engine to the transmission means after a predetermined warm up operation of the engine, the programming means including means for stopping the engine after a predetermined move, the programming means including means for again opening the valve means and repeating the above-outlined cycle.

7. The line of claim 6 wherein the prime mover comprises an internal combustion engine including a starter, the programming means including actuating means for repeatedly actuating the starter a predetermined number of times, and means responsive to running of the engine for rendering the actuating means ineffective.

8. The line of claim 6 wherein the programming means serves to repeat the cycle a predetermined maximum number of times.

9. In an irrigation line, a plurality of sections of pipe joined together to form a pipe line, a plurality of wheels supporting and keyed to the pipe sections, a prime mover carriage, means for energizing the prime mover carriage for a predetermined number of cycles of a predetermined duration and for preventing the energization of the prime mover carriage after the occurrence of the predetermined number of cycles, means on the prime mover carrriage journaling one of the pipe sections, a prime mover on the prime mover carriage, a bull gear keyed to the pipe line and driven by the prime mover, a slave carriage, means on the slave carriage journaling a second one of the pipe sections, a shaft, means on the pipe sections journaling the shaft in a position extending along the pipe sections from one of the carriages to the other and revolving the shaft as the pipe sections are rotated, a plurality of pairs of sprockets arranged around and revolved with the shaft, the sprockets of each pair being keyed together, first chain means connecting one sprocket of each pair together, drive chain means meshing with some of the other sprockets, means driving the drive chain means in synchronism with the drive of the bull gear, means keying one end of the shaft to one sprocket of one of the pairs of sprockets, and planetary transmission means at the slave carriage for driving the second one of the pipe sections.

10. The line of claim 9 including annular means mounting the pairs of sprockets on said one of the pipe sections.

11. The line of claim 10 wherein the annular means includes spaced first and second discs and a plurality of aligned pairs of bearing means on the discs, a plurality of shafts journaled in the pairs of bearing means and carrying and keyed to the pairs of sprockets.

* * * * *

UNITED STATES PATENT AND TRADEMARK OFFICE
CERTIFICATE OF CORRECTION

PATENT NO. : 4,291,837
DATED : September 29, 1981
INVENTOR(S) : LYNDLE G. GHEEN

Figure 8:
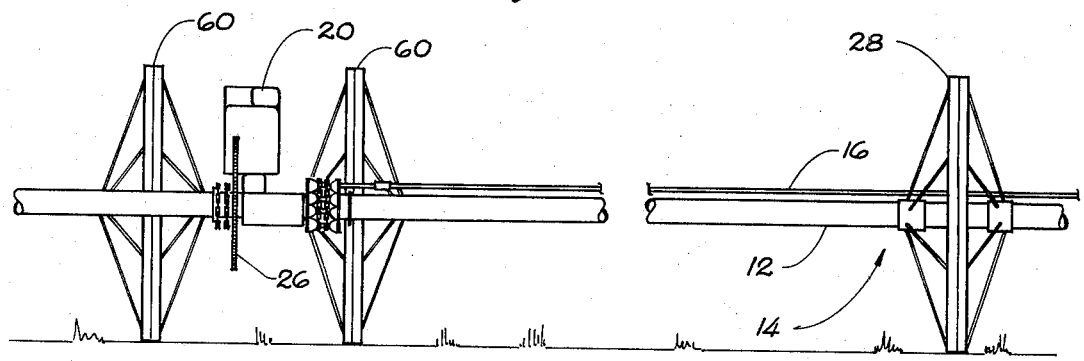
FIG. 8 is an enlarged, vertical, sectional view taken along line 8—8 of FIG. 7.

It is certified that error appears in the above-identified patent and that said Letters Patent are hereby corrected as shown below:

Column 2, line 31 - "(FIGS. 3 and 9)" should be --(FIGS. 8 and 9--.

Signed and Sealed this

Twenty-ninth Day of December 1981

[SEAL]

Attest:

Attesting Officer

GERALD J. MOSSINGHOFF

Commissioner of Patents and Trademarks